United States Patent [19]

Morreale

[11] 3,751,696
[45] Aug. 7, 1973

[54] TOOTH ARRANGEMENT FOR A STEPPING MOTOR

[75] Inventor: Anthony P. Morreale, Whittier, Calif.

[73] Assignee: Computer Devices Corporation, Santa Fe Springs, Calif.

[22] Filed: Nov. 22, 1971

[21] Appl. No.: 200,772

[52] U.S. Cl. .............................. 310/49, 310/259 A
[51] Int. Cl. ........................................... H02k 37/00
[58] Field of Search ..................... 310/49, 162, 266, 310/269, 156, 114; 318/138

[56] References Cited
UNITED STATES PATENTS

| | | | |
|---|---|---|---|
| 3,206,623 | 9/1965 | Snowdon | 310/49 |
| 3,343,014 | 9/1967 | Giles | 310/49 |
| 3,621,312 | 11/1971 | Palmero | 310/49 |
| 3,601,640 | 8/1971 | Egawa | 310/49 |
| 3,500,081 | 3/1970 | Drejza | 310/49 |
| 3,614,496 | 10/1971 | Schiethart | 310/49 |

OTHER PUBLICATIONS

Chai et al., Low–Inertia, High Torque Stepper Motor, IBM Techn. Disclosure Bulletin, Vol. 14, No. 11.

Primary Examiner—R. Skudy
Attorney—Leo J. Young et al.

[57] ABSTRACT

A stepping motor includes a stator assembly and a rotor assembly having teeth projecting toward each other. The rotor assembly includes a plurality of permanent magnets spaced-apart along the rotational axis with repelling poles of adjacent magnets facing each other. The teeth on the rotor project from a plurality of axially spaced-apart cylindrical members that cooperate with the magnets to form magnetic poles of the rotor with an interior member cooperating with near ends of adjacent magnets to form a single magnetic pole. In operation, magnetic flux lines between the stator and rotor assemblies split to form parallel circuits having a common path through the interior member.

The teeth are arranged in an alternating offset configuration having three axially extending sections corresponding to the three cylindrical rotor members. For each section there are a plurality of teeth on the stator that attract teeth on the rotor member and a separate plurality of teeth on the stator that repel teeth on the rotor member. Each tooth of the plurality of attracted teeth on the rotor member aligns itself with a tooth on the stator. On the other hand, each tooth of the plurality of repelling teeth on the stator projects toward the middle of the space between adjacent teeth on the rotor and repel them equally.

8 Claims, 3 Drawing Figures

PATENTED AUG 7 1973 3,751,696

TOOTH ARRANGEMENT FOR A STEPPING MOTOR

BACKGROUND OF THE INVENTION

1. Field of the Invention

This invention relates to electrical stepping motors, and more particularly to an improved construction for a stepping motor having a plurality of permanent magnets in its rotor assembly.

2. Description of the Prior Art

Permanent magnet rotor stepping motors are well known. The stepping motors include a cylindrical stator having a plurality of salient poles projecting toward the rotational axis. Each salient pole is diametrically opposed to another salient pole so that a plurality of pole-pairs are formed. A coil is wrapped around each salient pole for carrying energization current, and in response thereto the salient pole forms a magnetic pole by electromagnetic action. In use, each pole of a selected pole-pair forms a north magnetic pole while each pole of an orthogonal pole-pair forms a south magnetic pole.

The permanent magnet rotor is provided with axially spaced cylindrical pole members, each having teeth projecting radially outwardly from its periphery. Each salient pole of the stator also has a series of teeth and these teeth project toward the teeth of the rotor.

In use, magnetic attraction between oppositely magnetized teeth on the stator and on the rotor develops a torque causing the rotor to move to discrete position. It is desirable to maximize this magnetic attraction so that the stepping motor will develop high output torque. Various techniques have been used in prior art devices in an attempt to increase output torque. In the most common approach, the rotor has a single permanent magnet bounded at opposite axial ends by cylindrical pole members which form north and south magnetic poles. An annular gap between the two cylindrical members presents a high reluctance path so that the flux density therebetween is low. Teeth run in a straight line the full length of each stator pole. Teeth running axially on the north rotor pole are offset in a circumferential direction from teeth running axially on the south rotor pole.

The amount of this offset corresponds to one-half the pitch of the rotor teeth. Consequently, the teeth on the north rotor pole are attracted to and align with teeth on a south-energized stator pole-pair, and the teeth on the south rotor pole are equally repelled by and align in the middle of teeth on the same south-energized pole-pair. At the same time, the teeth on the south rotor pole are attracted to and align with a north-energized pole-pair that is orthogonal to the south-energized pole-pair and the teeth on the north rotor pole are equally repelled by and align in the middle of the same north-energized pole-pair.

In designing these motors, it has been the practice to increase the running length of the teeth in order to increase the amount of magnetic attraction and generate relatively higher torques. However, this approach soon meets with diminishing returns. The explanation for the diminishing returns is given by the principles of magnetic circuits. In this arrangement a magnetic circuit is formed as follows. Flux extends radially outwardly between the north rotor pole, and the south stator pole, bends to extend circumferentially to the north stator pole, bends to extend axially down the north stator pole, bends to extend radially inwardly between the north stator pole and the south rotor pole, and bends to extend axially back to the north rotor pole.

For longer units the magnetic reluctance of the magnetic circuit path through the stator becomes undesirably high and tends to diminish the flux density. A longer magnet may be used to increase the magnetic strength, but this further increases the magnetic reluctance unless the cross-sectional area of the magnet is also increased. And, larger diameter magnets have higher inertia so that higher torques are obtained at the expense of higher inertia. More turns on the stator coils can also be used to obtain the higher magnetic strength made necessary by the increased reluctance. However, the inductance of the coils increases in relation to the increased number of turns. In a stepper motor, output torque diminishes rapidly at high pulse rates for higher inductance units.

Another arrangement used in the past to increase output torque develops two independent magnetic circuits. In this arrangement, the stator teeth again run in a straight line throughout the unit. The rotor assembly includes two permanent magnets and each magnet has its own pair of cylindrical pole forming members. The magnetic poles alternate in a north, south, north, south arrangement along the rotational axis. In this arrangement, there are three annular gaps between the four pole-forming members. Each annular gap presents a high reluctance path so that the flux density in the gap is low. The near ends of the two magnets in this arrangement must be magnetically isolated from one another. In general principle this approach is equivalent to two separate motors mounted to the same shaft. The necessity for the annular gap between the two permanent magnets has the undesirable effect of lengthening the unit. Since the unit is longer, the winding resistance of the coils is higher and more heat losses occur in use. Furthermore, extra material such as spacers increase the weight and cost of the unit.

SUMMARY OF THE INVENTION

The present invention is directed to a tooth arrangement for a stepping motor in which parallel magnetic flux circuits are developed which share a common path. Each of the parallel circuits has substantially one-half of the reluctance that a single series circuit prior art unit has. Thus a higher torque unit is made possible without the disadvantages attendant to increasing permanent magnet diameter. Furthermore, each adjacent parallel magnetic circuit shares a common path and thus the need for a extra annular gap, spacers, and magnetic isolators is avoided.

A stepping motor in accordance with the present invention comprises rotor and stator assemblies having teeth projecting toward each other. The rotor assembly includes permanent magnet means exhibiting consequent magnetic poles such as a plurality of permanent magnets arranged along a rotor shaft with repelling magnetic poles facing each other. A plurality of cylindrical members are arranged on the rotor shaft to cooperate with the magnetic means to form at least three axially spaced-apart magnetic pole pieces of the rotor. A plurality of parallel magnetic circuits are developed with each adjacent pair sharing a path through an interior consequent magnetic pole.

In a preferred embodiment, pole forming pieces of both the stator assembly and the rotor assembly are laminated. The rotor assembly includes two permanent magnets arranged with repelling magnetic poles facing each other. Two laminated cup-shaped members at remote ends of the two permanent magnets thus provide two pole pieces having the same magnetic polarity. A single laminated member is disposed between the adjacent ends of the two magnets providing a single pole piece of opposite magnetic polarity to the two end pole pieces. Each of these three rotor pole forming members has teeth around its periphery, with the teeth being axially aligned. The stator assembly includes three stacks of laminations, one for each opposite end portion of the motor and one for the intermediate portion of the motor. Each stack comprises a plurality of flat cylindrical laminations of magnetic material. Each lamination has an outer ring portion and, integral therewith, a plurality of equally spaced pole portions that project radially inwardly. The inner edge of the pole forming members form arcs of a common circle concentric with the ring portion. A plurality of equally spaced teeth project radially inwardly from the inner edge of each pole portion. The teeth in the center stack are offset circumferentially from the teeth of the two outer stacks by an amount that is one-fourth of the spacing between adjacent teeth. The two end stacks are secured directly to the intermediate stack.

DETAILED DESCRIPTION

Figure 1:
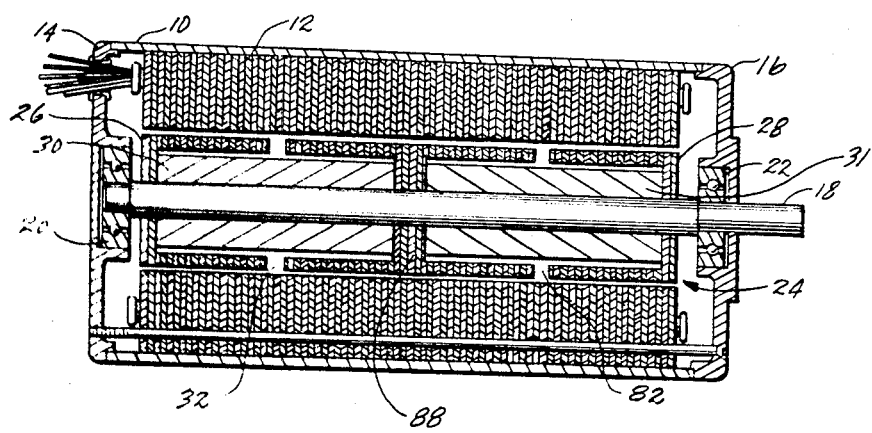
FIG. 1 is an axial section of the motor of the present invention.

As shown in FIG. 1 an outer cylinder 10 and end brackets 14 and 16 house the stepping motor. A laminated stator 12 is press fitted or otherwise secured in the housing and defines a cylindrical opening. A motor shaft 18 is rotatably supported by bearings 20 and 22 in the end brackets and in turn supports a rotor assembly 24 in the cylindrical opening formed by the stator 12.

Two permanent magnets 30 and 31 are pressed on the shaft 18 and cemented or otherwise joined thereto. The magnets are magnetized axially and have their repelling magnetic poles facing each other. Two cup-shaped members 26 and 28 cooperate with remote ends of the two permanent magnets to form pole pieces of the same magnetic polarity. A member 88 having an H-shape in axial cross-section cooperates with the near ends of the two permanent magnets to form a single pole piece having the opposite magnetic polarity from the end pole pieces. In a substantially equivalent arrangement the two permanent magnets 30 and 31 are replaced by a single, longer permanent magnet having consequent magnetic poles. Bar type permanent magnets having consequent magnetic poles are well known and are described for example in a book entitled FUNDAMENTALS OF ELECTRICITY AND MAGNETISM by L. B. Loeb, published in 1947 by John Wiley and Sons. After assembly, the pole pieces 26, 28, and 88 provide a substantially continuous outer cylindrical surface concentric with the axis of rotation of the shaft 18. The surface is broken by two small annular gaps 32 and 82 between adjacent edges of pole pieces 26 and 88 and adjacent edges of pole pieces 88 and 28 respectively.

Figure 2:
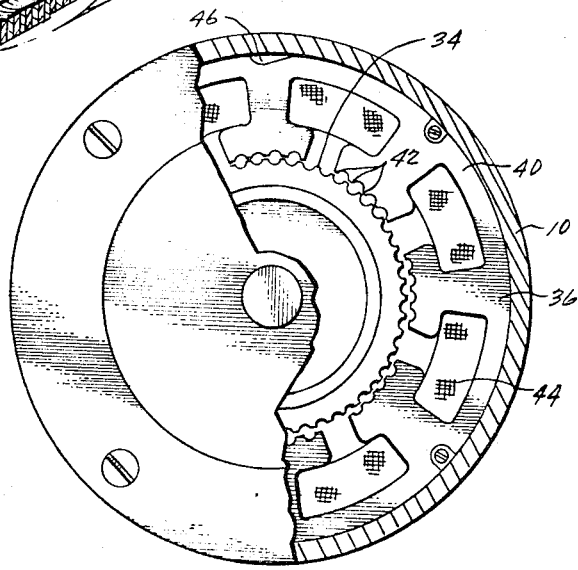
FIG. 2 is a partial cross-sectional view of the motor of FIG. 1.

As shown in FIG. 2, the rotor has a series of axially extending rotor teeth 34. The teeth are equally spaced around the outer periphery of the rotor. The number of teeth provided is selected on the basis of the desired step size. For example, a stepping motor designed to rotate in incremental steps of 1.8° of rotation has 50 equally spaced teeth on the rotor, providing a pitch of 7.2°. Preferably, the teeth in the respective pole pieces are axially aligned and are formed by conventional gear hobbing techniques after the rotor is assembled. In an alternative arrangement the teeth in the remote pole pieces 26 and 28 are axially aligned whereas the teeth in the intermediate pole piece 88 are offset by one-half of the tooth pitch so that each tooth runs along an imaginary straight line intersecting the space between adjacent teeth on the remote pole pieces 26 and 28. In any event, a key feature of the present invention resides in the fact that the teeth on the intermediate pole piece 88 are axially continuous, that is, there is no need for any annular gap between the two permanent magnets or any magnetic shielding to isolate the two sections of the rotor.

Figure 3:
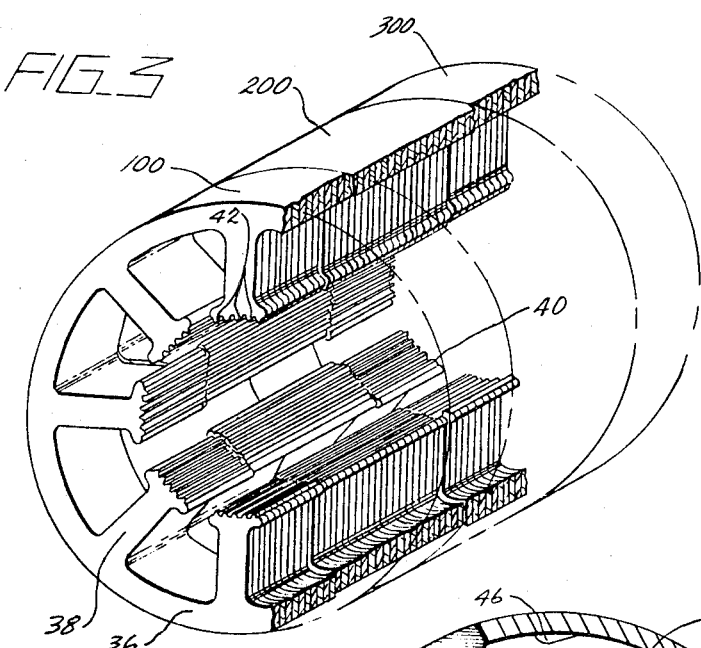
FIG. 3 is a perspective view, partially cut away of the stator core.

Preferably, the stator core 12 is assembled in accordance with the underlying principle of a method disclosed and claimed in U.S. Pat. No. 3,601,640, assigned to the assignee of the present invention. As best shown in FIG. 3, each lamination is identical in shape and comprises an outer continuous ring portion 36 with, for example, eight inwardly projecting salient pole portions 38 having their centerlines spaced equally at angular increments of 45°. Each inwardly projecting pole portion terminates in an arcuately shaped edge, and the eight arcuate edges lie on a common circle concentric with the outer ring 36.

The inner edge of each pole portion 38 is notched to form five equally spaced teeth 42 that project toward the rotational axis. These teeth are formed, in the example described, with the same pitch as the teeth on the rotor, namely, a pitch of 7.2°. In each pole portion, the centerline of the middle one of the five teeth is offset from the centerline of the pole portion by an angular distance of a fourth of the tooth pitch, e.g. 1.8°.

It has been the practice, in accordance with the teachings of the above-referenced patent to assemble the stator core by stacking the laminations in two axially continuous sections. In one section, the tooth centerline is offset to the left of the pole centerline for each lamination. After assembly of this section, axially continuous teeth are formed which run in a straight line one-half the axial length of the stator core. In the second section, the laminations are reversed by rotating the lamination 180° about the centerline of a pole. Thus the tooth centerline is offset to the right of the pole centerline for each lamination. After assembly of this section of the stator, axially continuous teeth are formed which run in a straight line for the other one-half of the axial length of the stator core. In the final assembly, the two sections are joined together with the teeth in the first section offset circumferentially relative to the teeth in the second section by an amount equal to half the pitch of the teeth.

According to the present invention, the stator core has at least one additional section of laminations. In the example described and best shown in FIGS. 1 and 3, a stack section 100 extends axially a distance corresponding to the distance from the middle of annular gap 32 to the end of rotor member 26 (i.e. the left end as viewed in FIG. 1); a stack section 200 extends axially a distance corresponding to the distance between the middle of annular gap 32 and the middle of annular gap 82 and a stack section 300 extends axially a distance corresponding to the distance from the middle of annular gap 82 to the remote end of rotor member 28 (i.e. the right end as viewed in FIG. 2). Preferably, stack sections 100 and 300 extend an equal axial length and stack section 200 extends approximately twice this length. The laminations in the intermediate stack section 200 are reversed from the laminations in the end stack sections 100 and 300. After assembly of the three stacks, corresponding teeth in the end stacks lie in the same imaginary straight line, and this imaginary straight line runs through the middle of the space between adjacent teeth in the intermediate stack section 200.

As shown in FIG. 2, an indexing slot 46 is formed in the outer ring portion 36 of each lamination for use in aligning the laminations during assembly. By making the slot asymmetrical, as shown, an alignment fixture can be provided which assures that the laminations in the stack sections are properly positioned. Once stacked, the laminations are bonded together in a conventional manner to form a unitary stator core.

After bonding, a coil winding 44 is wrapped around each salient pole of the stator core. The coil windings are electrically connected together in various series or parallel arrangements well known in the art. In any event, in operation, coils around two orthogonal pole-pairs are simultaneously energized. For example, considering FIG. 3 as if it were a clock, at a particular point in time the coils around the salient poles at 12 o'clock and 6 o'clock are energized to produce north magnetic poles and the coils around salient poles at 3 o'clock and 9 o'clock are energized to produce south magnetic poles. At another point in time, the coils around salient poles at 1:30 and 7:30 are energized to produce north magnetic poles and the coils around salient poles at 4:30 and 10:30 are energized to form south magnetic poles.

Consider now the manner in which parallel magnetic circuit are developed in the operation of an embodiment wherein opposite end rotor pole pieces 26 and 28 form north magnetic poles and the intermediate rotor pole piece 88 forms a south magnetic pole. In operation, when the 12 o'clock and 6 o'clock stator salient poles produce north magnetic poles, the teeth on opposite arcuate portions of the rotor intermediate pole piece 88 are attracted to and align with the teeth on the 12 o'clock and 6 o'clock stator salient poles respectively. Owing to the offset arrangement of the teeth, the teeth on corresponding opposite arcuate portions of the two rotor end pole pieces 26 and 28 are equally repelled by and aligned in the middle of adjacent teeth on the 12 o'clock and 6 o'clock stator pole pieces respectively. At the same time, the stator salient poles at 3 o'clock and 9 o'clock form south magnetic poles. Consequently, the teeth on opposite arcuate portions of the rotor intermediate portions are equally repelled by and align in the middle of adjacent teeth on the 3 o'clock and 9 o'clock stator salient poles respectively. Again owing to the offset arrangement of the teeth, the teeth on opposite arcuate portions of the two rotor end pieces 26 and 28 are attracted to and align with the teeth on the 3 o'clock and 9 o'clock stator pole pieces respectively. In this example of operation parallel magnetic flux circuits are produced which share a common path through the rotor intermediate pole piece 88. In one of these parallel magnetic circuits, the rotor intermediate pole piece 88 is in a magnetic circuit that includes rotor end piece 26, which is axially adjacent to it on one side. In another parallel magnetic circuit the rotor intermediate pole piece 88 is in a magnetic circuit that includes rotor end piece 28, which is axially adjacent to it on its opposite side.

It should be noted that arrangements other than the embodiment described in detail herein are within the scope of the present invention. For example, as mentioned above, in another arrangement the rotor teeth on the spaced-apart pole pieces can be offset relative to each other in a manner similar to the way in which the teeth on the stator stacks are offset in the example described. It should be evident of course that in this other arrangement, the teeth on the stator core must run in a continuous straight line. As another example, additional permanent magnets can be provided to form additional consequent magnetic poles. For each additional magnet, there is provided an additional rotor pole piece of H shaped cross section and the tooth arrangement has alternating offsets for the pole forming members. Furthermore, a single permanent magnet having a plurality of consequent magnetic poles can be provided in which case the intermediate pole pieces will have a ring shape.

What is claimed is:

1. In a stepping motor having a stator assembly and a rotor assembly positioned for rotation within the stator assembly, the stator assembly having teeth projecting toward teeth on the rotor assembly, the improvement comprising magnetic means in the rotor assembly including two permanent magnets providing magnetic poles spaced apart along the rotational axis with adjacent poles having the same magnetic polarity, a single magnetic pole piece between adjacent magnets, and a pole piece at either end of the rotor assembly; each pair of adjacent teeth on one of the assemblies defining a straight continuous notch extending parallel to the rotational axis; and the teeth on the other assembly having a series of axially extending portions, one portion for each magnetic pole piece of the magnetic means, the teeth of each portion being angularly offset from the adjacent portion by one-half of the pitch so that for each tooth a straight line is defined by each portion thereof which lies in the middle of the space between adjacent teeth on an axially adjacent portion of the assembly; and each magnetic pole piece between two magnets of the rotor being in both a magnetic circuit that includes the permanent magnet of the rotor axially adjacent thereto on one side and a magnetic circuit that includes the permanent magnet of the rotor axially adjacent thereto on the opposite side.

2. A stepping motor comprising a stator assembly including a core of magnetic material and having a plurality of salient poles, each pole terminating in an arcuate inner surface with the arcuate surfaces defining a cylindrical opening; and a cylindrical rotor assembly rotatably positioned in the opening, the rotor assembly including magnetic means having axially spaced-apart consequent magnetic poles, and two end and one intermediate cylindrical pole members each having around the periphery thereof substantially equal spaced-apart teeth extending parallel to the rotational axis of the member, the end members cooperating with the magnetic means to form like magnetic poles and the intermediate member cooperating with the magnetic means to form the opposite magnetic pole, the arcuate surfaces of each of the salient poles of the stator assembly having substantially equally spaced-apart teeth projecting toward the teeth in the rotor assembly, the teeth on one of said stator and rotor assemblies being axially aligned throughout its full length, the teeth on a first intermediate portion of the other assembly being axially aligned through the length of the intermediate portion, the teeth on second and third portions that extend axially from opposite ends of the intermediate portion being axially aligned with each other and offset from the teeth on the intermediate portion by an amount equal to one-half of the spacing between teeth.

3. A stepping motor according to claim 2 wherein the magnetic means includes two permanent magnets spaced-apart along the rotational axis and having like magnetic poles facing each other, the adjacent ends of the two magnets cooperating with the second cylindrical member to form a single one of the magnetic poles.

4. A stepping motor according to claim 3, the teeth on the rotor assembly being axially aligned throughout its full length, the stator assembly salient poles and the teeth projecting therefrom comprising two end stacks and an intermediate stack of laminations, the laminations in each stack being secured face-to-face with the teeth in the stack being axially aligned.

5. A stepping motor according to claim 4 wherein the intermediate stack axially extends between the approximate axial midpoints of the two permanent magnets.

6. A stepping motor according to claim 2 wherein the salient poles and the teeth projecting therefrom comprise two end stacks and an intermediate stack of identically shaped laminations wherein the radial centerline of a tooth on each lamination is offset from the radial centerline of a pole portion by an amount equal to one-fourth of the spacing between adjacent teeth, and means securing the stacks with alternate offsets such that the centerlines of each pole portion of all laminations are aligned and the laminations in the intermediate stack has its teeth offset in one direction relative to the centerline of the pole portion and the laminations in the two end stacks each have their teeth offset in the other direction.

7. A stepping motor comprising a stator including a single core of magnetic material and having a plurality of poles forming a cylindrical opening, a rotor positioned for rotation within the cylinder opening of the stator, the rotor including at least two permanent magnet means magnetically polarized in a direction parallel to the axis of rotation of the rotor with the direction of flux being opposite in adjacent magnet means, each of the magnet means including pole members at either end, one of the pole members being common to adjacent magnet means, each of the pole members having a cylindrical surface concentric to and closely spaced from the cylinder opening of the stator, the cylindrical surface of the pole members and the poles of the stator having radially projecting teeth extending parallel to the axis of rotation of the rotor, the teeth being angularly positioned such that for a given pole of the stator when the teeth of the stator are directly aligned with the teeth of the common pole member associated with a pair of adjacent magnet means of the rotor, the teeth of the two outer pole members of the adjacent magnetic means are offset relative to the teeth on the stator pole.

8. A stator core for a stepping motor comprising two end stacks and at least one intermediate stack of laminations, the end stacks being in direct contact with the intermediate stack to form a unitary magnetic core structure, each stack comprising a plurality of flat cylindrical laminations of magnetic material, the two end stacks extending axially a substantially equal, first distance and each intermediate stack extending axially approximately twice the first distance, each lamination having an outer ring portion and a plurality of equally spaced pole portions that project radially inwardly, the inner edge of the pole portions forming arcs of a common circle concentric with the ring portion, the inner edge having a plurality of equally spaced teeth that project radially inwardly, the radial centerline of one of the teeth being offset from the radial centerline of the pole portion by an amount that is one-fourth of the spacing between adjacent teeth, the laminations in each stack being secured face-to-face with the teeth in the stack being axially aligned, and means securing the stacks with alternate offsets such that the centerlines of each of the pole portions of all the laminations are aligned and the laminations in each two adjacent stacks have their teeth offset to the left and to the right respectively relative to the centerline of the pole portions.

* * * * *